Dec. 27, 1927.

J. BATH

THREAD GAUGE AND HOLDER

Filed May 29, 1926

1,654,233

Inventor
John Bath
By Attorneys

Patented Dec. 27, 1927.

1,654,233

UNITED STATES PATENT OFFICE.

JOHN BATH, OF WORCESTER, MASSACHUSETTS.

THREAD GAUGE AND HOLDER.

Application filed May 29, 1926. Serial No. 112,707.

This invention relates to a thread gauge and more particularly to an improved holder for such a gauge.

It is the object of my invention to provide a combination of thread gauge and gauge holder which possesses many important advantages, both in manufacture and in use and operation.

With this general object in view, an important feature of my invention relates to the provision of a thread gauge in which the durability of the gauge is doubled at very slight increase in cost of manufacture.

Another object is to provide a construction in which the gauge holder is adapted to receive a pair of gauges, one at each end, both gauges being firmly held, but one or both of the gauges being readily removable when desired.

In the preferred form of my invention, I provide a construction in which two hardened thread gauges are clamped against the ends of a relatively soft slidable plunger. While more specifically described as a thread gauge, certain features of my invention are of value and utility when used for other types of gauges.

My invention further relates to arrangements and combinations of parts which will be hereinafter described and more particularly set forth in the appended claims.

A preferred form of the invention and certain modifications thereof are shown in the drawings in which Fig. 1 is a sectional elevation of my improved gauge;

Figure 1:
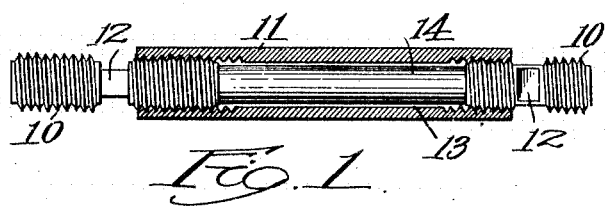
Figure 2:
Fig. 2 is a side elevation of one of the gauge members.
Figure 3:
Fig. 3 is a side elevation of the sliding plunger.

Referring to Figs. 1, 2 and 3, I have shown the preferred form of my improved thread gauge and holder, in which a thread gauge 10 is mounted in each end of a body or holder having the form of an internally threaded sleeve 11. Each thread gauge 10 is preferably formed with a threaded portion at each end thereof and with a reduced intermediate portion 12 having flattened side faces, or otherwise constructed so that a suitable wrench or spanner may be applied thereto.

The sleeve 11 is threaded for a certain distance at each end thereof and has a passage 13 connecting the threaded portions and loosely supporting a sliding plunger 14, which is preferably of soft steel or copper or of some other relatively soft metal. The gauge members 10 on the other hand are preferably of hardened steel.

In assembling my improved gauge and holder for use, the thread gauges 10 are screwed into the opposite ends of the sleeve 11 until they firmly contact with the relatively soft sliding plunger 14, which is engaged by the inner ends of the hardened members 10. When thus engaged, it is found that the contact of the hardened end surfaces of the gauge members with the relatively soft end faces of the plunger or rod 14 causes the parts to be firmly secured and to resist displacement much more effectively than would be the case if the rod 14 were also of hardened steel.

Figure 7:
Fig. 7 is an end view thereof.

The outside of the sleeve 11 is preferably hexagonal or otherwise non-circular, (Fig. 7), so that the gauge members 10 may be readily removed therefrom by applying a wrench or spanner to the gauge members and if necessary an additional wrench to the sleeve 11.

The life of the thread gauges is practically doubled by forming the two threaded end portions as exact duplicates, merely reversing each gauge member in the holder when one end thereof becomes worn below standard size.

The combination is also well adapted for use as a "go and no-go" gauge by making one of the threaded gauge members 10 a few thousandths of an inch smaller than the other, but the difference being so slight that the smaller gauge will be as firmly held in the sleeve 11 as it would have been if of standard size.

It is also sometimes desirable to provide a gauge with different sizes of threads at the opposite ends of the holder. This can be accomplished in one way by providing a gauge member 15 (Fig. 4) with the outer end 16 formed of a different size from the inner end which fits the regular sleeve 11.

This outer end 16 may be either larger or smaller than the standard size.

Figure 4:
Fig. 4 is a modified form of thread gauge, adapted for use in my improved holder.
Figure 6:
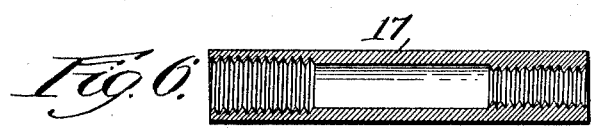
Fig. 6 is a sectional view of a sleeve or gauge holder, showing a modification.

The same result may be accomplished by providing a modified form of sleeve 17, as indicated in Fig. 6 in which the threaded opening at one end of the sleeve is of a different size from that at the other end. This latter construction preserves the advantage of reversing the gauge members at both ends thereof and is to that extent preferable over the use of gauge members of two sizes, as shown in Fig. 4.

Figure 5:
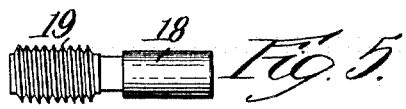
Fig. 5 is a further modification showing a plug gauge or rod adapted for use in my holder.
Figure 8:
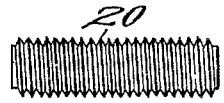
Fig. 8 shows a thread gauge having a further slight modification.

The sleeve 17 is also adapted for receiving gauge members of other types such as are indicated in Fig. 5, in which the outer end 18 of the gauge member 19 is cylindrical and is adapted for use as a plug gauge or for other gauging purposes. A simpler thread gauge member 20 (Fig. 8) may be made as a continuous screw thread from end to end, without the intermediate reduced portion. Such a gauge member can usually be removed by the hands or if necessary may be held in lead jaws.

Having thus described several forms of my invention, the advantages thereof will be readily apparent. The thread gauge members themselves are of small size and may be easily and cheaply manufactured. Furthermore each gauge member is provided with a gauging surface at each end thereof and the gauge members may be readily reversed in the holder when they become worn, or in the event of accidental injury.

Having thus described my invention and the advantages thereof, I do not wish to be limited to the details herein disclosed, otherwise than as set forth in the claims, but what I claim is:—

1. A gauge and holder comprising an internally threaded sleeve, a plunger freely slidable in said sleeve, and a pair of gauge members threaded into said sleeve and abutting the ends of said slidable plunger, said gauge members having an intermediate portion of non-circular cross section to which a tool may be applied for turning said members in said sleeve.

2. A gauge holder comprising an internally threaded sleeve, a plunger freely slidable in said sleeve, and a pair of gauge members threaded into said sleeve and abutting the ends of said slidable plunger, said sleeve having threads of the same size at its two ends and said gauge members having threads of slightly different diameter to provide a "go and no-go" gauge.

In testimony whereof I have hereunto affixed my signature.

JOHN BATH.